United States Patent

Kusumoto et al.

[11] Patent Number: 5,675,204
[45] Date of Patent: Oct. 7, 1997

[54] PERMANENT MAGNET DYNAMO-ELECTRIC MACHINE

[75] Inventors: Keiichi Kusumoto; Keiichi Konishi; Shuzo Isozumi, all of Tokyo, Japan

[73] Assignee: Mitsubishi Denki Kabushiki Kaisha, Tokyo, Japan

[21] Appl. No.: 529,859

[22] Filed: Sep. 18, 1995

[30] Foreign Application Priority Data

Aug. 18, 1995 [JP] Japan .................... 7-210612

[51] Int. Cl.$^6$ ...................................... H02K 1/18
[52] U.S. Cl. ..................... 310/154; 310/91; 310/42
[58] Field of Search ............................ 310/42, 154, 156, 310/83, 89, 91, 218, 88, 281

[56] References Cited

U.S. PATENT DOCUMENTS

| | | | |
|---|---|---|---|
| 3,772,546 | 11/1973 | Means | 310/154 |
| 3,790,830 | 2/1974 | Bonfiglio | 310/42 |
| 4,580,072 | 4/1986 | Morishita | 310/154 |
| 4,703,212 | 10/1987 | Aboukrat et al. | 310/218 |
| 4,763,031 | 8/1988 | Wang | 310/83 |
| 4,851,727 | 7/1989 | Tanaka | 310/154 |
| 5,136,197 | 8/1992 | Hallett | 310/83 |
| 5,264,749 | 11/1993 | Maeda et al. | 310/154 |
| 5,391,063 | 2/1995 | Hantle et al. | 417/423.7 |
| 5,481,148 | 1/1996 | Moribayashi et al. | 310/154 |
| 5,576,588 | 11/1996 | Moribayashi et al. | 310/154 |
| 5,578,884 | 11/1996 | Moribayashi et al. | 310/154 |

FOREIGN PATENT DOCUMENTS

| | | | |
|---|---|---|---|
| 0017524 | 10/1980 | European Pat. Off. | H02K 1/18 |
| 0238249 | 9/1987 | European Pat. Off. | H02K 1/18 |
| 1941169 | 4/1970 | Germany | H02K 1/18 |
| 2931093 | 2/1980 | Germany | H02K 1/18 |
| OS 2134325 | 8/1984 | Germany | |
| 3426996 | 2/1986 | Germany | H02K 1/18 |
| OS 3510845 | 10/1986 | Germany | |
| OS 2650712 | 2/1991 | Germany | |
| 4401847 | 7/1995 | Germany | H02K 1/18 |
| 6284607 | 10/1994 | Japan | H02K 1/18 |

Primary Examiner—Steven L. Stephan
Assistant Examiner—Michael Wallace, Jr.
Attorney, Agent, or Firm—Sughrue, Mion, Zinn, Macpeak & Seas

[57] ABSTRACT

A low-cost permanent magnet dynamo-electric machine which can prevent an occurrence of a chip in a permanent magnet and is superior in the ease of fabricating the machine. This machine has an elastic catching member consisting of a ring-like portion and a plurality of protruding pieces axially projected from this ring-like portion. This machine further has a yoke, onto the inner circumferential surface of which a plurality of auxiliary poles are welded at an isotropic angular pitch. Further, in this machine, each of permanent magnets has a side surface brought into abutting engagement with the corresponding auxiliary pole. Moreover, the protruding pieces of the elastic catching member are forced into a space between the other side surface of each of the permanent magnets and the adjoining auxiliary pole, so that the plurality of the permanent magnets surround an armature. Furthermore, the ring-like portion of the elastic catching member is put into abutting engagement with a rear end face of each of the permanent magnets.

4 Claims, 4 Drawing Sheets

PERMANENT MAGNET DYNAMO-ELECTRIC MACHINE

BACKGROUND OF THE INVENTION

1. Field of the Invention

The present invention relates to a permanent magnet dynamo-electric machine for use in a starter motor (or starting motor) and an alternator, in which is used a permanent magnet as a field magnet for supplying a magnetic field.

2. Description of the Related Art

FIG. 6 is a sectional view of a planetary gear reduction starter which is illustrated as an example of a conventional electric motor. FIG. 7 is a perspective view of the planetary gear reduction starter, which illustrates how a permanent magnet is mounted therein.

As shown in these figures, an armature 1 serving as a rotor of a d.c. motor is provided on an armature rotation shaft 2 in such a manner as to be integral therewith. Further, a cylindrical yoke 3 is placed in such a manner as to surround this armature 1. Moreover, a front bracket 5 is connected to an end face of this yoke 3. An internal tooth gear 4 composing a planetary gear reduction machine is fitted into this front bracket 5. A sun gear 6 is formed at the front end portion of the armature rotation shaft 2.

A disk-like flange 4a is provided at the front end portion of the internal tooth gear 4 in such a manner as to project inwardly. Further, a cylindrical flange 4b is provided on the inner peripheral surface of the flange 4a in such a way as to protrude forwardly. Furthermore, a flange portion 10 composing an arm of the planetary gear reduction machine is integral with an output rotation shaft 11. This output rotation shaft 11 is detachably supported on a sleeve bearing 12 serving as a bearing fitted into this flange 4b. Further, this output rotation shaft 11 is restricted by this flange portion 10 from moving in the direction in which a thrust is exerted. Moreover, for example, three supporting pins 9 are erected, for instance, on a same circumference of this flange portion 10 at a uniform angular pitch. Furthermore, a planetary gear 7 is detachably or removably supported on each of the supporting pins 9 through a bearing 8 fitted into the inner peripheral surface thereof. At that time, each of the planetary gears 7 meshes with the sun gear 6 and the internal tooth gear 4.

A sleeve bearing 13 serving as a bearing is fitted into a concave part in a rear inner face portion of the output rotation shaft 11. The front end portion of the armature rotation shaft 2 is detachably supported by this sleeve bearing 13. Further, a steel ball 14 having the function of transferring a thrust load is confined between the end portions of the armature rotation shaft 2 and the output rotation shaft 11.

A collar portion 3a extending radially is formed at a front end portion of the yoke 3 in such a manner as to be integral therewith. Further, the collar portion 3a restrains the planetary gear 7 from moving in a thrust direction, namely, a direction in which a thrust is exerted. Moreover, the collar portion 3a walls (or cuts) a speed reduction portion off from a motor portion so as to protect each of the speed reduction portion and the motor portion against dust. Furthermore, a packing 19 is confined among the front bracket 5, the internal tooth gear 4 and the collar portion 3a. Therefore, grease applied on a meshed portion between the planetary gear 7 and the internal tooth gear 4 can be prevented from flowing out therefrom. Additionally, a rear bracket 17 is fitted into an opening-side end face portion of the yoke 3.

A plurality of auxiliary poles 18 (see FIG. 7) is welded onto the inner peripheral surface of the yoke 3 at a uniform angular pitch. Further, each of circular-arc-like permanent magnets 15 has a side surface brought into abutting engagement with the auxiliary pole 18. Moreover, a magnet holder 16 is forced into a space between the other side surface of each of the permanent magnets 15 and the adjoining auxiliary pole 18, so that the plurality of the permanent magnets 15 surround the armature 1.

A metallic elastic member such as a non-magnetic stainless steel product is used as a material of this magnet holder 16. The section of this magnet holder 16 is shaped like a character "U". Moreover, this magnet holder 16 has a side wall 16a unfolded in both of circumferential directions and further has pawl portions 16b to be used to restrain the permanent magnets 15 from moving in the direction in which the shaft extends. Thus the elasticity or resilience of the side wall 16a of the magnet holder 16 acts on the permanent magnets 15 in such a manner as to press the magnets 15 in the circumferential directions and outwardly radially. As a result, one of the side surfaces of each of the permanent magnet 15 is pressed against the corresponding auxiliary pole 18. Moreover, the outer circumferential surface of each of the permanent magnets 15 is pressed against the inner circumferential surface of the yoke 3. Furthermore, the pawl portions 16b of the magnet holder 16 engage with both of the axial end faces of each of the auxiliary poles 18 and the permanent magnets 15, respectively. Therefore, the permanent magnets 15 are restrained from moving in the direction in which the shaft extends.

Incidentally, the permanent magnets 15 and the auxiliary poles 18 of the numbers equal to the number of poles provided in the motor are placed therein.

Next, an operation of the aforementioned planetary gear reduction starter will be described hereinbelow.

The armature 1 is energized by closing a key switch (not shown). Further, torque is produced at the energized armature 1 under the magnetic energization of the permanent magnets 15. The torque generated by the armature 1 is transmitted to the planetary gear 7 through the sun gear 6 mounted on the armature rotation shaft 2. This planetary gear 7 meshes with the internal tooth gear 4. Therefore, while rotating around the supporting pin 9, this planetary gear 7 moves around the armature rotation shaft 2. Thus the torque of the armature 1 is therefore reduced in rotating speed before it is transmitted to the flange portion 10 and further transmitted to the output rotation shaft 11 through the flange portion 10. The torque of this output rotation shaft 11 is transmitted to a ring gear (not shown) of an internal combustion engine through a pinion (not shown) of an overrunning clutch.

As described above, the conventional planetary gear starter holds the permanent magnets 15 by using the metallic magnet holders 16. Thus the conventional planetary gear starter has encountered the problems that when mounting the permanent magnets 15 therein, the permanent magnets are liable to be broken or chipped and that the non-magnetic stainless steel product used as the material of the magnet holder 16 is expensive and thus the cost of this starter is increased. This conventional planetary gear starter further has encountered the problem that the magnet holders 16 of the number equal to the number of the poles provided in the motor become necessary and thus the number of parts is increased and consequently, the facility or ease of fabricating the starter is diminished.

The present invention is accomplished to resolve the aforementioned problems of the conventional planetary gear starter.

SUMMARY OF THE INVENTION

Accordingly, an object of the present invention is to obtain a low-cost permanent magnet dynamo-electric machine which can prevent an occurrence of a chip in a permanent magnet and is superior in the ease of fabricating the machine.

To achieve the foregoing object, in accordance with an aspect of the present invention, there is provided a permanent magnet dynamo-electric machine which comprises a cylindrical yoke, a plurality of permanent magnets mounted on the inner circumferential surface of the yoke at a uniform angular pitch in the circumferential direction of the yoke, a rotor rotatably mounted in an inner circumferential portion of the plurality of permanent magnets and a resin elastic catching member for elastically engaging with the plurality of permanent magnets and for stopping the plurality of permanent magnets from moving in the direction of the axis thereof and in the circumferential direction thereof.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Hereinafter, the preferred embodiments of the present invention will be described in detail by referring to the accompanying drawings.

Embodiment 1

Figure 1:
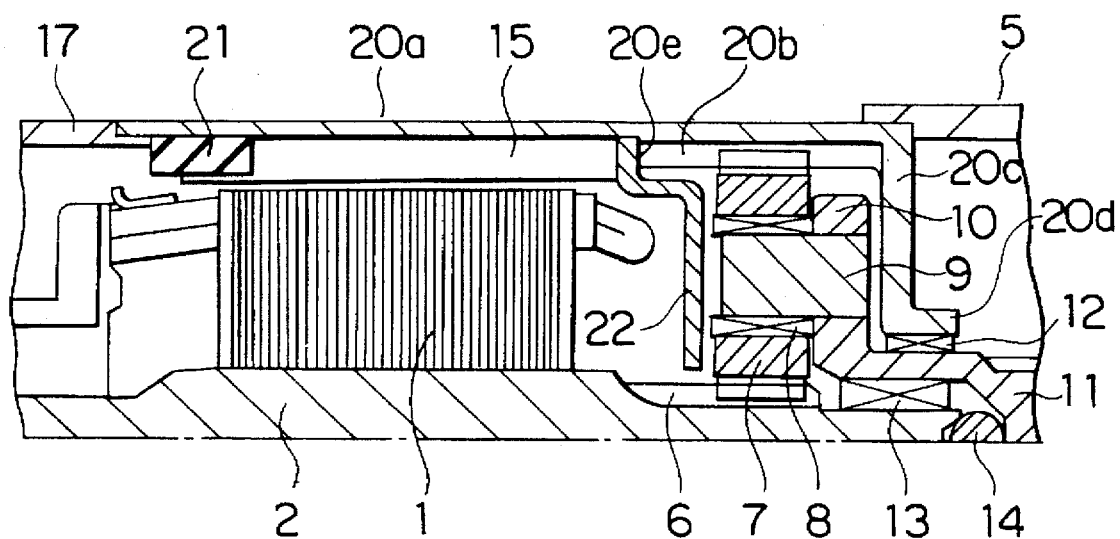
FIG. 1 is a sectional view of a permanent magnet dynamo-electric machine embodying the present invention, namely, Embodiment 1 of the present invention.
Figure 2:
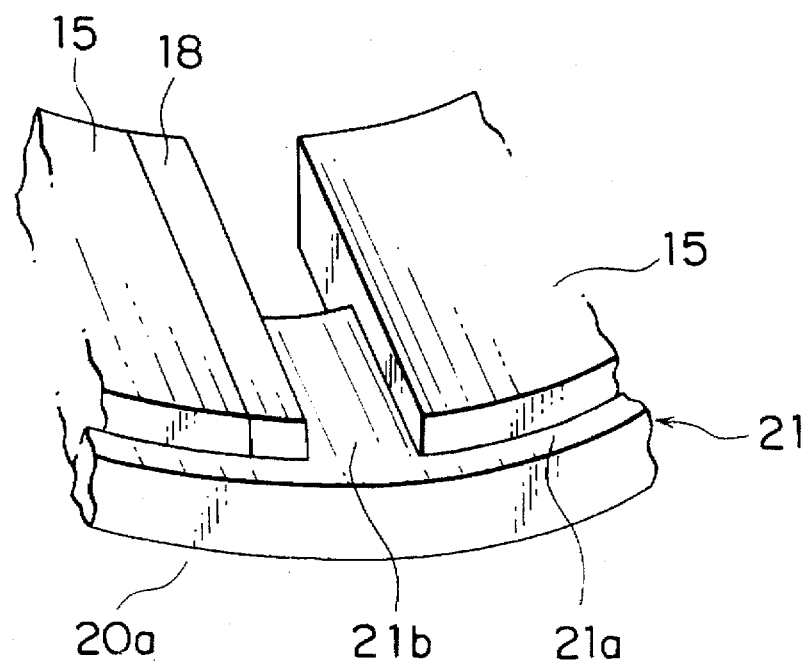
FIG. 2 is a perspective view of the permanent magnet dynamo-electric machine embodying the present invention, namely, the Embodiment 1 of the present invention, which illustrates how permanent magnets are mounted therein.
Figure 3:
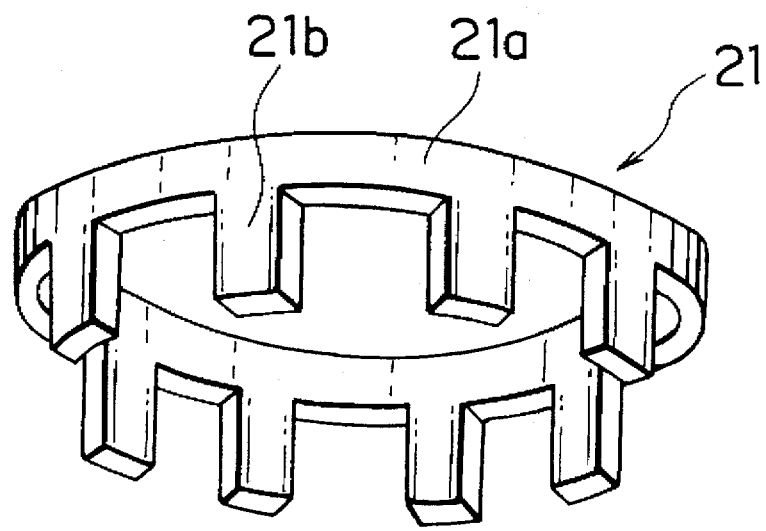
FIG. 3 is a perspective view of an elastic catching member of the permanent magnet dynamo-electric machine embodying the present invention, namely, the Embodiment 1 of the present invention.
Figure 6:
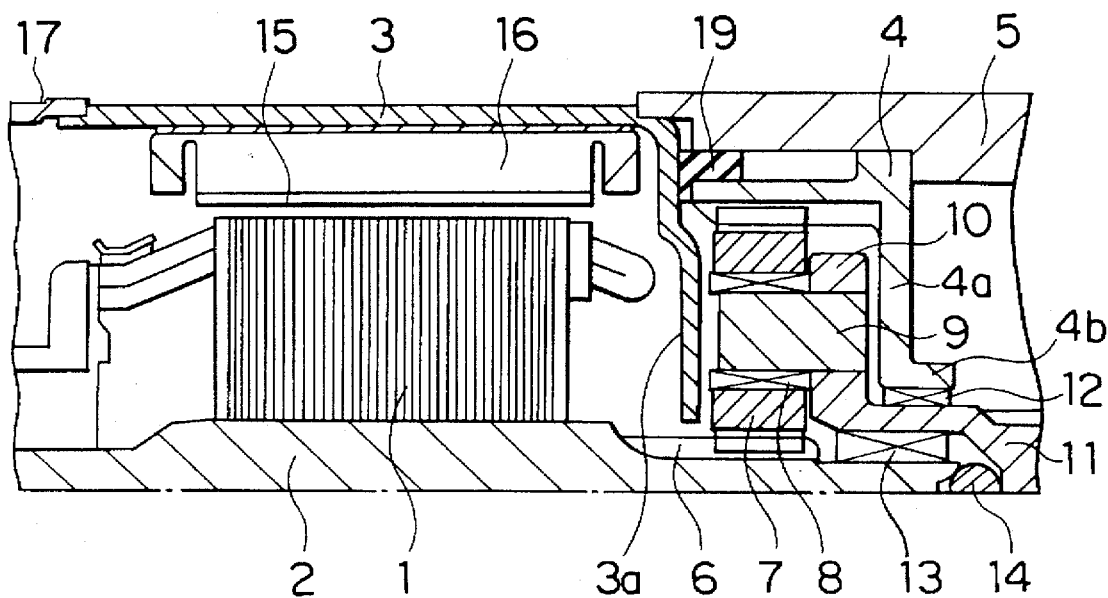
FIG. 6 is a sectional view an planetary gear reduction starter which is illustrated as an example of a conventional electric motor.
Figure 7:
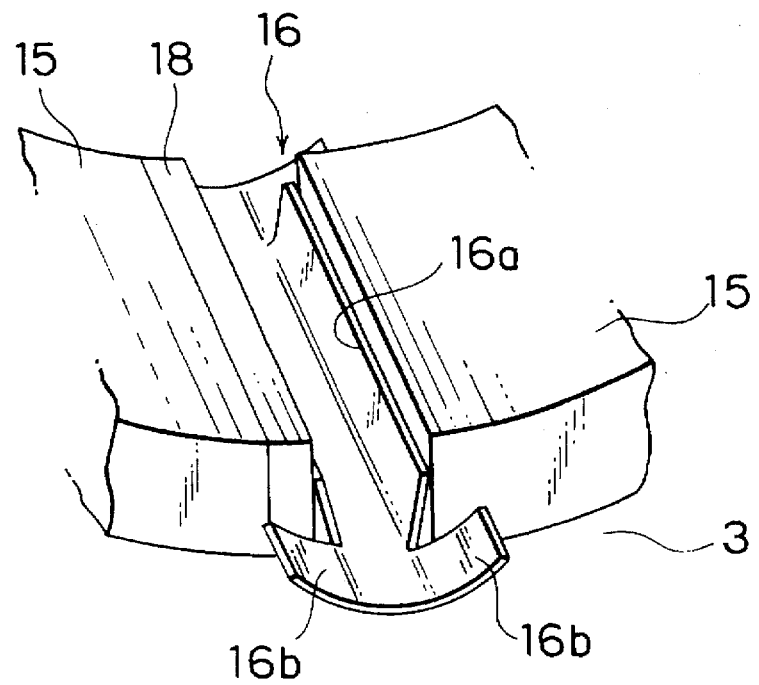
FIG. 7 is a perspective view of the planetary gear reduction starter, which illustrates how a permanent magnet is mounted therein.

FIG. 1 is a sectional view of a permanent magnet dynamo-electric machine embodying the present invention, namely, the Embodiment 1 of the present invention. FIG. 2 is a perspective view of the permanent magnet dynamo-electric machine embodying the present invention, namely, the Embodiment 1 of the present invention, which illustrates how a permanent magnet is mounted therein. FIG. 3 is a perspective view of an elastic catching member of the permanent magnet dynamo-electric machine embodying the present invention, namely, the Embodiment 1 of the present invention. In these figures, like reference characters designate same or corresponding parts of the conventional planetary gear reduction starter of FIGS. 6 and 7.

In FIGS. 1 to 3, an internal tooth gear 20b is formed at a front end of a cylindrical yoke 20a in such a manner as to be integral therewith. Further, a cylindrical flange 20d is formed at the inner circumferential end of a flange 20c of the internal tooth gear 20b in such a way as to protrude to the front thereof. Moreover, a step-like portion 20e is formed in the border between a yoke 20a and the internal tooth gear 20b. Further, an elastic catching member 21 is made of an elastic resin such as rubber and consists of a ring-like portion 21a and a plurality of protruding pieces 21b projected from this ring-like portion 21a in parallel with the shaft center, namely, the center axis or line thereof. A ring-like plate 22 restrains the planetary gear 7 from moving in the thrust direction. Moreover, the ring-like plate 22 walls a speed reduction portion off from a motor portion so as to protect each of the speed reduction portion and the motor portion against dust.

In the permanent magnet dynamo-electric machine constructed as described above, the front end portion of the internal tooth gear 20b formed in such a manner as to be integral with the yoke 20a is fitted into the front bracket 5. Further, the flange portion 10 is detachably supported on the sleeve bearing 12 fitted to the inner circumferential face portion of the flange 20d of the internal tooth gear 20b. Furthermore, a plurality of supporting pins 9 are erected on a same circumference of this flange portion 10 at a uniform angular pitch. Moreover, the planetary gear 7 is detachably supported on each of the supporting pins 9 through the bearing 8 fitted into the inner peripheral surface thereof. Additionally, the armature rotation shaft 2 is detachably supported on the sleeve bearing 13 fitted into a concave part of the rear internal circumferential portion of the output rotation shaft 11 formed in such a manner as to be integral with the flange portion 10. At that time, each of the planetary gears 7 meshes with the internal tooth gear 20b and the sun gear 6, which is formed in the front end portion of the armature rotation shaft 2. Further, a steel ball 14 is confined between the end portions of the armature rotation shaft 2 and the output rotation shaft 11.

A plurality of auxiliary poles 18 are welded onto the inner peripheral surface of the yoke 20a at a uniform angular pitch. Further, each of circular-arc-like Permanent magnets 15 has a side surface brought into abutting engagement with the corresponding auxiliary pole 18. Moreover, the Protruding piece 21b of the elastic catching member 21 is forced into a space between the other side surface of each of the permanent magnets 15 and the adjoining auxiliary pole 18 from the rear end side of the corresponding one of the permanent magnets 15. At that time, the ring-like portion 21a of the elastic catching member 21 is put on the rear end face of the corresponding one of the permanent magnets 15. Furthermore, the plate 22 is inserted into a space between the step-like portion 20e and the front end of the corresponding one of the permanent magnets 15.

Additionally, the rear bracket 17 is fitted into an opening-side end face portion of the yoke 20a, so that the plurality of the permanent magnets 15 surround the armature 1.

Thus, the elastic catching member 21 is axially pressed by the fitting force of the rear bracket 17. As a result, the ring-like portion 21a contracts, and a compressive elastic force is generated therein. The compressive elastic force of this ring-like portion 21a acts on and presses the permanent magnets 15 and the plate 22 against the step-like portion 20e. Consequently, the permanent magnets 15 and the plate 22 are restrained from moving in the direction in which the shaft extends, and are fitted thereto. Moreover, each of the protruding pieces 21b of the elastic catching member 21 is forcedly inserted into a space between the corresponding permanent magnet 15 and the corresponding auxiliary electrode 18 and is then constricted to thereby produce a repulsive force. The repulsive force of this protruding piece 21b acts on and presses the corresponding permanent magnet 15 in the circumferential direction. Thus, one of the side surfaces of each of the permanent magnets 15 is pressed against the corresponding auxiliary pole 18. Therefore, each of the permanent magnets 15 is restrained from moving in the circumferential direction and is fitted thereto.

Thus, in the case of the Embodiment 1, the permanent magnets 15 are positioned and held by using the resin elastic catching member 21 instead of the metallic magnet holder of the conventional starter. Therefore, the permanent magnets can be prevented from being chipped or broken when assembling the machine. Further, the cost of materials can be low. Moreover, the machine can excel in workability. Consequently, a low-cost machine can be realized.

Further, the elastic catching portion 21 consists of the ring-like portion 21a and the plurality of protruding pieces 21b projected from this ring-like portion 21a in parallel with the shaft center. Thereby, the number of parts for positioning the permanent magnets 15 can be reduced. Consequently, the facility or ease of fabricating the machine can be enhanced.

Moreover, the yoke 20a and the internal tooth gear 20b are formed in such a way as to be integral with each other. Even in that respect, the number of parts can be reduced.

Furthermore, the elastic catching member 21 is confined in a fitting portion of the yoke 20a, which is fitted to the rear bracket 17. Thereby, the waterproof property of the machine can be enhanced.

Incidentally, in the case of the aforesaid Embodiment 1, the elastic catching member 21 is placed only on the rear end side of each of the permanent magnets 15. However, if the elastic catching member 21 is placed at both of the front and rear ends of each of the permanent magnets 15, similar effects can be obtained. Additionally, in this case, the elastic catching member 21 and the plate 22, which are placed on the front end side of each of the permanent magnets 15, may be formed in such a manner as to be integral with each other.

Embodiment 2

Figure 4:
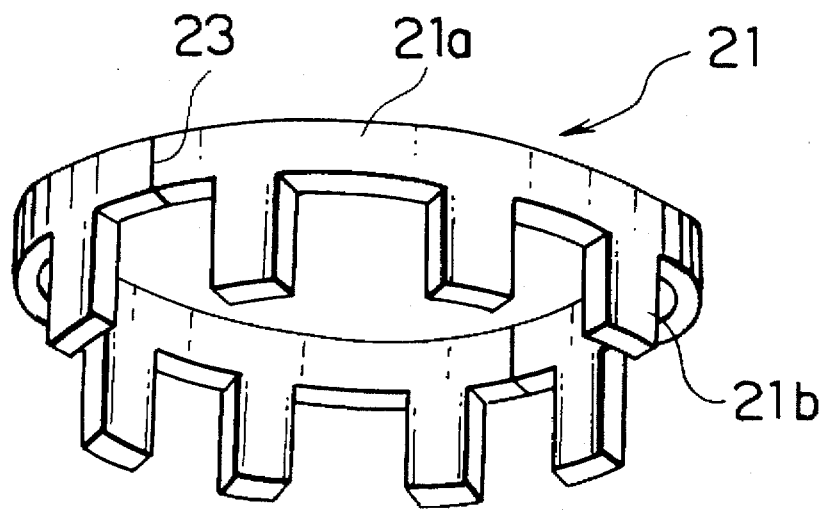
FIG. 4 is a perspective view of an elastic catching member of an elastic catching member of another permanent magnet dynamo-electric machine embodying the present invention, namely, Embodiment 2 of the present invention.

In the case of the aforementioned Embodiment 1, the elastic catching member 21 is constituted by an integrated member which consists of the ring-like portion 21a and the plurality of protruding pieces 21b projected from this ring-like portion 21a in parallel with the shaft center. In contrast, in the case of this Embodiment 2, the elastic catching member 21 is constituted by a two-body member which is divided by a parting line 23 as illustrated in FIG. 4. Consequently, effects similar to those of the aforementioned Embodiment 1 can be obtained.

Embodiment 3

Figure 5:
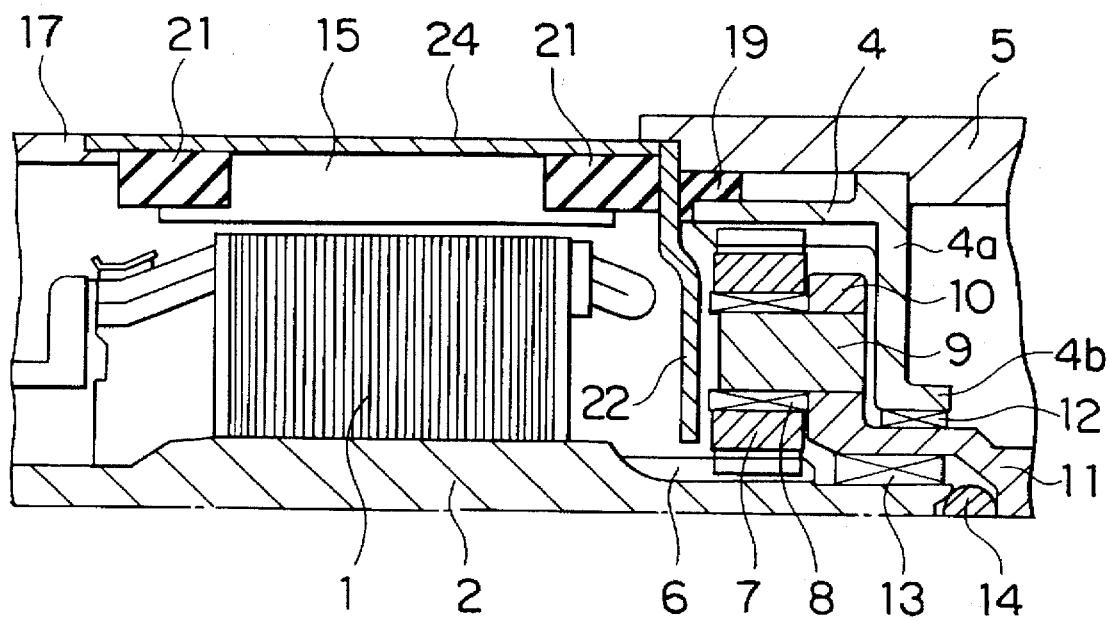
FIG. 5 is a sectional view of a further permanent magnet dynamo-electric machine embodying the present invention, namely, Embodiment 3 of the present invention.

FIG. 5 is a sectional view of a further permanent magnet dynamo-electric machine embodying the present invention, namely, the Embodiment 3 of the present invention.

In the case of the Embodiment 3, a plurality of auxiliary poles 18 are welded onto the inner peripheral surface of a yoke 24 at a uniform angular pitch. Further, each of circular-arc-like permanent magnets 15 has a side surface brought into abutting engagement with the auxiliary pole 18. Moreover, the protruding pieces 21b of the elastic catching member 21 are forced into a space between the other side surface of each of the permanent magnets 15 and the adjoining auxiliary pole 18 from the front and rear end sides of the corresponding one of the permanent magnets 15. At that time, the ring-like portion 21a of the elastic catching member 21 is put on the front and rear end faces of the corresponding one of the permanent magnets 15. Furthermore, the plate 22 is inserted into a space between the elastic catching member 21 and the front bracket 5 provided on the front end side of the corresponding one of the permanent magnets 15.

Additionally, the rear bracket 17 is fitted into an opening-side end face portion of the yoke 24, so that the plurality of the permanent magnets 15 surround the armature 1.

Thus, the elastic catching member 21 is axially pressed by the fitting force of the rear bracket 17. As a result, each of the ring-like portions 21a contracts and generates an elastic force. The elastic force of this ring-like portion 21a acts on and presses the permanent magnets 15 and further presses the plate 22 against the front bracket 5. Consequently, the permanent magnets and the plate 22 are restrained from moving in the direction in which the shaft extends, and are fitted thereto. Moreover, each of the protruding pieces 21b of the elastic catching member 21 is forced into a space between the corresponding permanent magnet 15 and the corresponding auxiliary electrode 18 and is then constricted to thereby produce an elastic force. The elastic force of this protruding piece 21b acts on and presses the corresponding permanent magnet 15 in the circumferential direction. Thus, one of the side surfaces of each of the permanent magnets 15 is pressed against the corresponding auxiliary pole 18. Thereby, each of the permanent magnets 15 is restrained from moving in the circumferential direction and is fitted thereto.

Therefore, in the case of this Embodiment 3, effects similar to those of the Embodiment 1 can be obtained.

Further, in the case of this Embodiment 3, the yoke 24 is formed in such a way as to be separated from the internal tooth gear 4. Thus, the internal tooth gear 4, the flange portion 10 and the armature rotation shaft 2 can be sequentially assembled before the yoke 24 and the plate 22 are assembled. Consequently, the ease fabricating the machine can be enhanced.

Incidentally, in the case of the aforementioned Embodiment 3, the yoke 24 and the plate 22 are formed in such a manner as to be separated from each other. However, if the yoke 24 and the plate 22 are formed in such a manner as to be integral with each other, similar effects can be obtained.

Additionally, in the case of the Embodiment 3, the elastic catching member 21 and the plate 22, which are placed on the front end side of each of the permanent magnets, may be formed in such a way as to be integral with each other.

Further, in the case of each of the aforementioned Embodiments, the auxiliary poles 18 are welded onto the inner peripheral surfaces of the yoke 20a and 24, respectively. The present invention, however, can be applied to the dynamo-electric machine which has no auxiliary poles 18.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A permanent magnet dynamo-electric machine comprising:

a cylindrical yoke;

a rear bracket;

a plurality of auxiliary poles secured to the inner circumferential surface of said yoke at a uniform angular pitch in the circumferential direction of said yoke;

a plurality of permanent magnets, each (1) being mounted between respective adjacent ones of said plurality of auxiliary poles, (2) being in contact with one of said respective adjacent auxiliary poles, (3) being spaced from another of said respective adjacent auxiliary poles to define a space therebetween, (4) being on the inner circumferential surface of said yoke at a uniform angular pitch in the circumferential direction of said yoke, and (5) having an axial end face;

a rotor rotatably mounted in an inner circumferential portion of said plurality of permanent magnets; and a resin elastic catching member for elastically engaging with each of said plurality of permanent magnets at said end face and said space therebetween, said resin elastic catching member having (1) a ring-like portion with which said axial end faces make contact and (2) protruding pieces that axially project from said ring-like portion, said protruding pieces being forcedly inserted into each said space therebetween and exerting a circumferential compressive force on said plurality of permanent magnets, said circumferential compressive force restricting said plurality of permanent magnets from circumferential movement;

wherein said rear bracket compresses said resin elastic catching member, and causes said resin elastic catching member to exert an axial compressive force on said plurality of permanent magnets, said axial compressive force restricting said plurality of permanent magnets from axial movement.

2. The permanent magnet dynamo-electric machine according to claim 1, wherein said ring-like portion of said elastic catching member is divided into a plurality of parts in the circumferential direction.

3. The permanent magnet dynamo-electric machine according to claim 1, which further comprises:

an internal tooth gear formed in such a manner as to be integral with a front end portion of said yoke;

an output rotation shaft detachably supported on a bearing fitted to an inner circumferential portion of a flange of said internal tooth gear;

a rotor rotation shaft detachably supported on a bearing fitted into a concave portion of a rear inner circumferential portion of said output rotation shaft;

a plurality of planetary gears rotatably mounted on a flange portion which is formed on said output rotation shaft in such a manner as to be integral therewith and to mesh with said internal tooth gear and with a sun gear formed on a front end side of said rotor rotation shaft;

a front bracket to which a front end of said internal tooth gear is fitted;

a rear bracket fitted into a rear end opening of said yoke; and a plate, caught by an axial elastic force of said elastic catching member, for walling said rotor off from said plurality of planetary gears.

4. The permanent magnet dynamo-electric machine according to claim 1, which further comprises:

an internal tooth gear;

an output rotation shaft detachably supported on a bearing fitted to an inner circumferential portion of a flange of said internal tooth gear;

a rotor rotation shaft detachably supported on a bearing fitted into a concave portion of a rear inner circumferential portion of said output rotation shaft;

a plurality of planetary gears rotatably mounted on a flange portion which is formed on said output rotation shaft in such a manner as to be integral therewith and to mesh with said internal tooth gear and with a sun gear formed on a front end side of said rotor rotation shaft;

a front bracket to which a front end of said yoke and a front end of said internal tooth gear are fitted;

a rear bracket fitted into a rear end opening of said yoke; and a plate, caught by an axial elastic force of said elastic catching member, for walling said rotor off from said plurality of planetary gears.

* * * * *